(12) United States Patent
Caldwell et al.

(10) Patent No.: US 11,409,142 B2
(45) Date of Patent: Aug. 9, 2022

(54) ACTIVELY RECONFIGURABLE, HYPERBOLIC METASURFACES

(71) Applicants: Vanderbilt University, Nashville, TN (US); University of Georgia Research Foundation, Inc., Athens, GA (US)

(72) Inventors: Joshua D. Caldwell, Nashville, TN (US); Thomas G. Folland, Nashville, TN (US); Richard F. Haglund, Nashville, TN (US); Yohannes Abate, Athens, GA (US)

(73) Assignees: Vanderbilt University, Nashville, TN (US); University of Georgia Research Foundation, Inc., Athens, GA (US)

( * ) Notice: Subject to any disclaimer, the term of this patent is extended or adjusted under 35 U.S.C. 154(b) by 720 days.

(21) Appl. No.: 16/295,879

(22) Filed: Mar. 7, 2019

(65) Prior Publication Data
US 2019/0278112 A1 Sep. 12, 2019

Related U.S. Application Data

(60) Provisional application No. 62/641,089, filed on Mar. 9, 2018.

(51) Int. Cl.
*G02F 1/00* (2006.01)
*G02B 26/00* (2006.01)
(Continued)

(52) U.S. Cl.
CPC ............ *G02F 1/0311* (2013.01); *G02B 1/005* (2013.01); *G02B 1/08* (2013.01); *B82Y 20/00* (2013.01)

(58) Field of Classification Search
CPC ........ G02F 1/0018; G02F 1/03; G02F 1/0009; G02F 1/29; G02F 1/00; G02F 1/0322; G02B 26/00; G02B 26/001; G02B 26/004
(Continued)

(56) References Cited

U.S. PATENT DOCUMENTS

2021/0048558 A1* 2/2021 Falk et al. ............ G02F 1/0121

FOREIGN PATENT DOCUMENTS

CN 113845082 A * 12/2021

OTHER PUBLICATIONS

Folland, Reconfigurable infrared hyperbolic metasurfaces using phase change materials, (Oct. 22, 2018), Nature Communications (Year: 2018).*

(Continued)

*Primary Examiner* — Dawayne Pinkney
(74) *Attorney, Agent, or Firm* — Meunier Carlin & Curfman LLC

(57) ABSTRACT

Metallic and dielectric domains in phase change materials (PCM) provide spatially localized changes in the local dielectric environment, enabling launching, reflection, and transmission of hyperbolic polaritons (HPs) at the PCM domain boundaries, and tuning the wavelength of HPs propagating in hyperbolic materials over these domains, providing a methodology for realizing planar, sub-diffractive refractive optics. This approach offers reconfigurable control of in-plane HP propagation to provide design optical functionality because the phase change material can be manipulated by changing the local structure, for example, to manipulate polaritons in the adjacent hyperbolic material, thus tuning the wave propagation properties of the polaritons in the hyperbolic material.

16 Claims, 14 Drawing Sheets
(14 of 14 Drawing Sheet(s) Filed in Color)

(51) Int. Cl.
*G02F 1/03* (2006.01)
*G02B 1/08* (2006.01)
*G02B 1/00* (2006.01)
*B82Y 20/00* (2011.01)

(58) Field of Classification Search
USPC ........ 359/322, 321, 315, 237, 245, 250, 252
See application file for complete search history.

(56) References Cited

OTHER PUBLICATIONS

Autore, Marta, et al. "Boron nitride nanoresonators for phonon-enhanced molecular vibrational spectroscopy at the strong coupling limit." Light: Science & Applications 7.4 (2018): 17172-17172.
Basov, D. N., M. M. Fogler, and FJ García De Abajo. "Polaritons in van der Waals materials." Science 354.6309 (2016): aag1992.
Caldwell, Joshua D., et al. "Low-loss, infrared and terahertz nanophotonics using surface phonon polaritons." Nanophotonics 4.1 (2015): 44-68.
Caldwell, Joshua D., et al. "Sub-diffractional volume-confined polaritons in the natural hyperbolic material hexagonal boron nitride." Nature communications 5.1 (2014): 1-9.
Chen, Jianing, et al. "Optical nano-imaging of gate-tunable graphene plasmons." Nature 487.7405 (2012): 77-81.
Dai, S., et al. "Graphene on hexagonal boron nitride as a tunable hyperbolic metamaterial." Nature nanotechnology 10.8 (2015): 682-686.
Dai, S., et al. "Tunable phonon polaritons in atomically thin van der Waals crystals of boron nitride." Science 343.6175 (2014): 1125-1129.
Dai, Siyuan, et al. "Internal nanostructure diagnosis with hyperbolic phonon polaritons in hexagonal boron nitride." Nano letters 18.8 (2018): 5205-5210.
Fei, Zhe, et al. "Electronic and plasmonic phenomena at graphene grain boundaries." Nature nanotechnology 8.11 (2013): 821-825.
Folland, Thomas G., et al. "Reconfigurable infrared hyperbolic metasurfaces using phase change materials." Nature communications 9.1 (2018): 1-7.
Giles, Alexander J., et al. "Ultralow-loss polaritons in isotopically pure boron nitride." Nature materials 17.2 (2018): 134-139.
Guo, Yu, et al. "Applications of hyperbolic metamaterial substrates." Advances in OptoElectronics 2012 (2012).
Jacob, Zubin. "Nanophotonics: hyperbolic phonon-polaritons." Nature materials 13.12 (2014): 1081-1083.
Karzig, Torsten, et al. "Topological polaritons." Physical Review X 5.3 (2015): 031001.
Kim, Kris S., et al. "The Effect of Adjacent Materials on the Propagation of Phonon Polaritons in Hexagonal Boron Nitride." The journal of physical chemistry letters 8.13 (2017): 2902-2908.
Klembt, S., et al. "Exciton-polariton topological insulator." Nature 562.7728 (2018): 552-556.
Li, Peining, et al. "Hyperbolic phonon-polaritons in boron nitride for near-field optical imaging and focusing." Nature communications 6.1 (2015): 1-9.
Li, Peining, et al. "Infrared hyperbolic metasurface based on nano structured van der Waals materials." Science 359.6378 (2018): 892-896.
Li, Peining, et al. "Reversible optical switching of highly confined phononpolaritons with an ultrathin phase-change material." Nature materials 15.8 (2016): 870-875.
Liu, Song, et al. "Single crystal growth of millimeter-sized monoisotopic hexagonal boron nitride." Chemistry of Materials 30.18 (2018): 6222-6225.
Liu, Zhaowei, et al. "Far-field optical hyperlens magnifying sub-diffraction-limited objects." science 315.5819 (2007): 1686-1686.
Lopez, Rene, Leonard C. Feldman, and Richard F. Haglund Jr. "Size-Dependent Optical Properties of V O 2 Nanoparticle Arrays." Physical review letters 93.17 (2004): 177403.
Luk, Ting S., et al. "Near-infrared surface plasmon polariton dispersion control with hyperbolic metamaterials." Optics express 21.9 (2013): 11107-11114.
McGahan, Christina, et al. "Geometric constraints on phase coexistence in vanadium dioxide single crystals." Nanotechnology 28.8 (2017): 085701.
Nemilentsau, Andrei, Tony Low, and George Hanson. "Anisotropic 2D materials for tunable hyperbolic plasmonics." Physical review letters 116.6 (2016): 066804.
Ni, GuangXin, et al. "Fundamental limits to graphene plasmonics." Nature 557.7706 (2018): 530-533.
Prokes, S. M., et al. "Hyperbolic and plasmonic properties of Silicon/Ag aligned nanowire arrays." Optics Express 21.12 (2013): 14962-14974.
Rivera, Nicholas, et al. "Making two-photon processes dominate one-photon processes using mid-IR phonon polaritons." Proceedings of the National Academy of Sciences 114.52 (2017): 13607-13612.
Xu, Xiaoji G., et al. "One-dimensional surface phonon polaritons in boron nitride nanotubes." Nature communications 5.1 (2014): 1-6.
Zhao, Bo, et al. "Near-field heat transfer between graphene/hBN multilayers." Physical Review B 95.24 (2017): 245437.

* cited by examiner

ACTIVELY RECONFIGURABLE, HYPERBOLIC METASURFACES

CROSS REFERENCE TO RELATED APPLICATIONS

This application is a non-provisional of Provisional Patent Application Ser. No. 62/641,089, filed Mar. 9, 2018, which application is hereby incorporated by this reference in its entirety.

BACKGROUND

Field of the Endeavor

Embodiments of the present invention relate to optical devices at nanometer scale utilizing hyperbolic media tunable using phase change materials.

Background

Optical near and far fields can be manipulated by coupling light into the hybrid optical modes called polaritons. These modes can be stimulated in a variety of materials where oscillating charges couple to light (photons), creating a negative real part of the electric permittivity. Polaritons form at the interface of these 'polaratonic materials' and a dielectric, existing as a wave oscillating at the frequency of incident light, but with a wavelength that is compressed to values much smaller than the diffraction limit. Hyperbolic polaritons occur within materials or metamaterials/metasurfaces where the real part of the permittivity is negative along one or two axes (e.g., x,y direction in Cartesian coordinates) and positive along the other(s) (e.g., z direction). Hyperbolic polaritons differ from traditional surface-bound polaritons in several key ways; the electromagnetic fields of the light/charge hybrid mode (polariton) are confined within the volume of the hyperbolic media, the polariton propagates at an angle with respect to the z-axis dictated by the material properties and incident frequency and a superposition of multiple polaritons with decreasing wavelengths exist simultaneously, referred to as higher order modes. Hyperbolic media exist naturally in highly anisotropic crystals (e.g., hexagonal boron nitride or molybdenum trioxide), or as artificial three-dimensional materials (e.g., planar layers of alternating metals and dielectrics) or metasurfaces (alternating stripes of metallic and dielectric materials).

Phase change materials are class of materials which undergo a structural change upon exposure to external stimuli, resulting in a change in their optical properties.

Reconfigurability, that is, substantial changing of the optical response with a given external stimulus, has been a challenge in polaritonic materials in general, as it requires arbitrarily changing the shape of individual elements of the structure, dynamically controlling the local dielectric environment, or controlling the optical properties of the polaritonic material itself.

BRIEF SUMMARY

In accordance with the purpose(s) of this invention, as embodied and broadly described herein, this invention, in one aspect, relates to an optical component comprising a phase change material having an optical property having a first value associated with a first material phase and a second value associated with a second material phase; and a hyperbolic polaritonic material on the phase change material, the hyperbolic polaritonic material having a first optical response in a first direction and a second optical response in a second direction and a third optical response in the third direction.

In another aspect, the invention relates to a method of performing optical functions with an optical component comprising a phase change material having an optical property having a first value associated with a first material phase and a second value associated with a second material phase; and a hyperbolic material in stacked geometry on the phase change material, the hyperbolic material having a first optical response in a first direction and a second optical response in a second direction, and a third optical response in a third direction. The method comprises applying hyperbolic polaritons in the hyperbolic polaritonic material such that the hyperbolic polaritons cross over a boundary between the first material phase and the second material phase; and changing phase of the phase change material in the optical component by applying stimulus to the phase change material to change at least one the first value of the optical property and the second value of the optical property.

In yet another aspect, the invention relates to a hyperbolic waveguide, comprising: a dielectric domain dielectric/α-phase change material; a metallic/c-phase domain of a phase change material within the dielectric/α-phase of the phase change material; a hyperbolic polaritonic material on the metallic/c phase domain; and a gap in the metallic phase domain of the phase change material below a portion of the hyperbolic polaritonic material.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

Accordingly, the present disclosure describes a means to actively control hyperbolic polariton propagation through changing the ambient environment via inducing a change in phase within a suitable phase change material, placed adjacent to the hyperbolic media. By inducing local changes in the refractive index of the phase change material (PCM) by external stimulus (electrical, thermal or optical) via the phase change, the wavelength of the polariton can be modified. Therefore, as a result of locally controlling the refractive index of the PCM, the polariton propagation within the hyperbolic media can then be controlled. This can be used to direct light propagation on-chip, including focusing, diverging, waveguiding, etc. . . . . . The benefit of the PCM is that this response can be reconfigurable, that is, designed, erased and redesigned.

Prior works demonstrated surface polaritons coupled to PCMs, however, with surface-confined modes, the mode can only propagate useable distances when the PCM is in a low-loss dielectric phase. Other approaches towards on-chip photonics are dictated by the design, which cannot be changed.

Principles described herein provide means to control light at deeply sub-diffractional dimensions. This offers avenues to directing light on-chip or providing approaches towards creating refractive optical components.

Further embodiments, features, and advantages of the actively reconfigurable, hyperbolic-PCM metasurfaces, as well as the structure and operation of the various embodiments of the actively reconfigurable, hyperbolic-PCM metasurfaces, are described in detail below with reference to the accompanying drawings.

It is to be understood that both the foregoing general description and the following detailed description are exemplary and explanatory only and are not restrictive of the invention as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying figures, which are incorporated herein and form part of the specification, illustrate actively reconfigurable, hyperbolic metasurfaces. Together with the description, the figures further serve to explain the principles of the actively reconfigurable, hyperbolic metasurfaces described herein and thereby enable a person skilled in the pertinent art to make and use the actively reconfigurable, hyperbolic-PCM metasurfaces.

DETAILED DESCRIPTION

Figure 1:
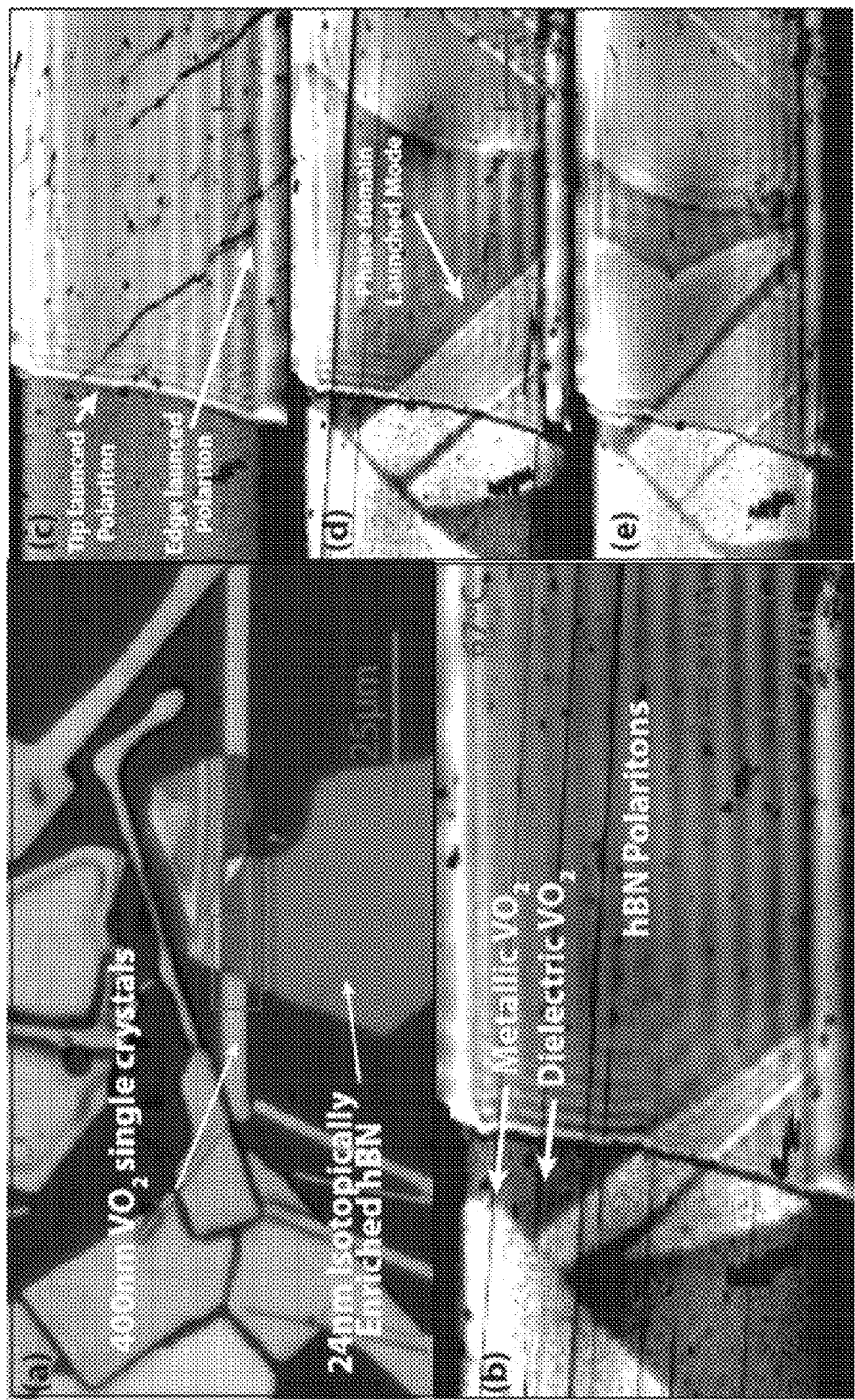
FIG. 1 shows phase transition of vanadium dioxide ($VO_2$).

Reference will now be made in detail to embodiments of the actively reconfigurable, hyperbolic-PCM metasurfaces with reference to the accompanying figures, in which like reference numerals indicate like elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Referring to FIG. 1, vanadium dioxide, ($VO_2$) undergoes a phase transition from semiconducting to metallic due to external stimuli, specifically increased temperature, applied electric bias/field, applied strain or laser excitation. In some examples, this was achieved by increased temperature. The simultaneous change in the dielectric constant can be detected by scattering-type scanning nearfield optical microscopy (s-SNOM). This dielectric change enables control the hyperbolic phonon polaritons in a crystal of hexagonal boron nitride (hBN) on top of the $VO_2$. As the $VO_2$ undergoes its phase transition, striped domains of the metallic phase form that alter the wavelength of hyperbolic polariton modes propagating within hBN and can also cause polaritons to be launched by the phase domain boundaries. As the temperature is varied, the metallic domains grow in size. The combination of metallic and dielectric PCM domains underneath an hBN slab provides a test-bed for planar hyperbolic surfaces. Any PCM that can be acted upon by an external stimulus to change its dielectric property so as to affect polariton propagation would be suitable for use in any configurations described herein, and the like.

Figure 2:
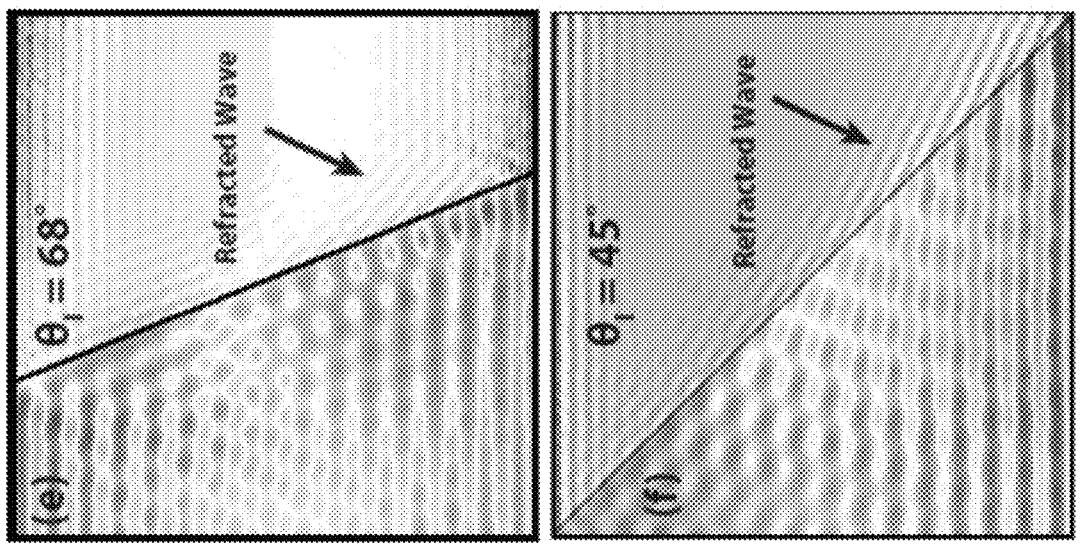
FIG. 2 shows refraction and reflection across phase domains of $VO_2$.
Figure 2:
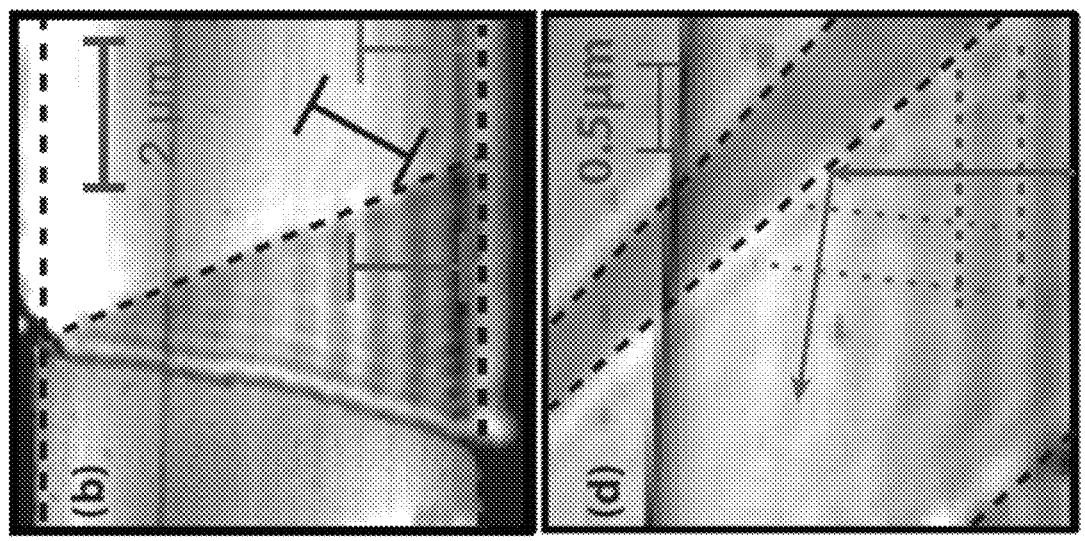
Figure 2:
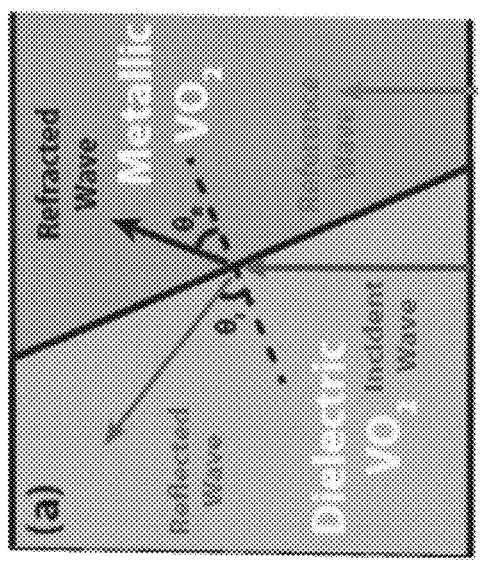
Figure 2:
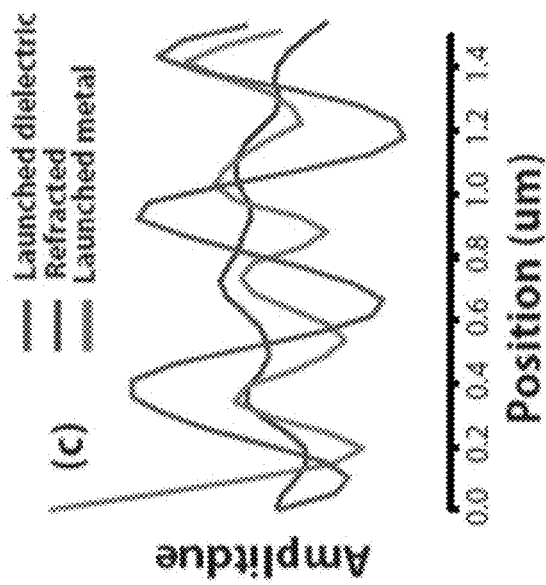

Referring to FIG. 2, polariton transmission, refraction and reflection (a) are seen in the region of the domain boundaries (b) across phase domains, a direct consequence of the change in polariton wavelength (wavevector) over the boundary. As will be appreciated by those of skill in the art, wavelength and wavevector are inversely related. Line profiles (c) show the polariton wave propagating in hBN over the dielectric VO2 phase (blue) has a longer wavelength than over the metallic (red), and is transmitted across the domain boundary and refracted (black). All waves propagating in hBN over the metallic $VO_2$ have the same wavelength, despite different propagation directions, suggesting this effect is attributable to refraction. Total internal reflection also occurs at the boundary, as shown in (d)—although multiple interferences complicates the observation of this effect within the image. To verify that this effect can be attributed to polariton refraction, the results were compared with full wave numerical simulations using Computer Simulation Technology (CST) studio (e-f), showing excellent agreement.

By integrating PCMs and polaritonic materials, changes in optical properties induced by such a phase transition can provide the means to control the polariton dispersion by changing the local dielectric environment in which the evanescent polaritonic near-fields propagate. Thus, they can be exploited to realize reconfigurable metasurfaces. One of the phases of PCMs is typically metallic and/or can exhibit high optical losses. Consequently, in previous studies of surface-confined polaritons, such as surface plasmon or surface phonon polaritons, the propagation was restricted to spatial regions over the PCM where a low-loss dielectric phase was present. This spatial propagation makes concepts such as nanophotonic waveguides, grating couplers and focusing elements that are difficult to realize in PCM-surface-polariton-based systems, despite the opportunities available.

Two changes in approach that overcome these previous limitations are applied according to principles described herein. Although not required for exercise of the principles described herein, isotopically enriched hBN, a natural hyperbolic medium that supports low-loss hyperbolic phonon polaritons (HPhPs), may be used as the polaritonic material, and may result in reduced losses in polariton propagation. The use of hyperbolic polaritons (HPs), (here hyperbolic phonon polaritons) where the polariton fields are largely confined to the bulk of the low-loss hBN, rather than at the interface between the polaritonic medium and the PCM, allows longer propagation lengths than in prior known devices. The ability to control and refract propagating hyperbolic polaritons with PCMs suggest the ability to create a reconfigurable metasurface.

According to principles described herein, hyperbolic polaritons allow the polaritons to remain sensitive to local changes in the dielectric function of the ambient environment, but the electromagnetic near-fields are strongly confined to the volume of the hyperbolic material. The HPs can interact with spatially localized regions where the phase transitions of the PCM occur without suffering significant optical losses from the interaction. Thus, the HPs propagate over both metallic and dielectric phases. For example, differences in the local dielectric environment between the metallic and dielectric domains results in a large change in the HP wavelength in the hBN over each domain, which in turn results in the refraction of the polariton when transmitting across the PCM phase-domain boundaries as dictated by Snell's law (Eq. (1), below). This means that the combination of hyperbolic media and PCMs employed here, and the like, can be used to create refractive optical elements and waveguides, as well as components benefiting from full optical functionalities that to this point have been limited to far-field optics.

Concepts according to these principles were demonstrated using electromagnetic modeling, showing that PCM-HPhP heterostructures can be designed as optical resonators and metasurfaces, as well as refractive near-field components, such as waveguides and lenses. This combination of PCMs with hyperbolic media provides a new toolset for near-field optical design and structuring. For reversible PCM transitions, any of these designs can be fully reconfigured using either thermal changes or approaches based on laser writing, for example. By exploiting the increasingly wide range of different PCMs and hyperbolic materials and metamaterials, such as hBN, $MoO_3$ and alternating stacks of doped and undoped semiconductor layers or metal/dielectric layers, and the like, these effects can be realized over an extended range of frequencies.

FIGS. 3a and 3b show a prototype device having a 24 nm-thick flake of $^{10}$B-enriched hBN (~99% enriched) transferred using low-contamination transfer techniques onto a single crystal of $VO_2$ grown on quartz. s-SNOM was used to directly map and visualize the evanescent optical fields on the structure, corresponding to polaritonic waves of compressed wavelength $\lambda_p$, propagating primarily within the volume of the hBN slab, as shown in FIG. 3a. HPhPs can be observed in two ways in s-SNOM images. First, polaritons launched by light scattered from the s-SNOM tip propagate to and reflect back from sample boundaries (e.g., a flake edge), creating interference fringes with spacing $\lambda_p/2$, which are scattered back to free space by the tip and detected. Also, polaritons can be directly launched from sample edges and propagate across the surface to interfere with the incident field at the tip, producing fringes with spacing $\lambda_p$. Thus, in s-SNOM maps, a superposition of both so-called "tip-launched" and "edge-launched" fringes may be observed and are interpreted by considering the fringe spacing from individual waves ($\lambda_p/2$ vs. $\lambda_p$) and the direction of polariton propagation.

Referring to FIG. 3c, the presence of both tip-launched (wavelength $\lambda_p/2$, purple line in the x direction) and edge-launched (wavelength $\lambda_p$, blue line in the y direction) HPhPs can be readily observed in the hBN slab transferred on top of the $VO_2$ single crystal. Here, this is visualized via the near-field amplitude s-SNOM image collected using a 1450 $cm^{-1}$ excitation laser at room temperature. The observation of both tip-launched and edge-launched modes in the x direction, whereas only edge-launched modes being apparent along the y direction, derives from the properties of the boundaries in the heterostructure sample, namely the edges of the hBN and $VO_2$ crystals. The edge of the hBN crystal provides for both high reflection of tip-launched HPhPs, as well as a sharp edge for direct initiation of edge-launched modes (x direction). In contrast, the small size (440 nm thickness, 6.5 µm width) of the $VO_2$ crystal provides sufficient momentum to robustly scatter into HPhP modes at the $VO_2$ crystal edges, as seen in the bottom/top edges in FIG. 3c. The interface between $VO_2$ and air at the crystal edge provides a significantly reduced reflection coefficient, however, which may suppress tip-launched waves.

Figure 3:
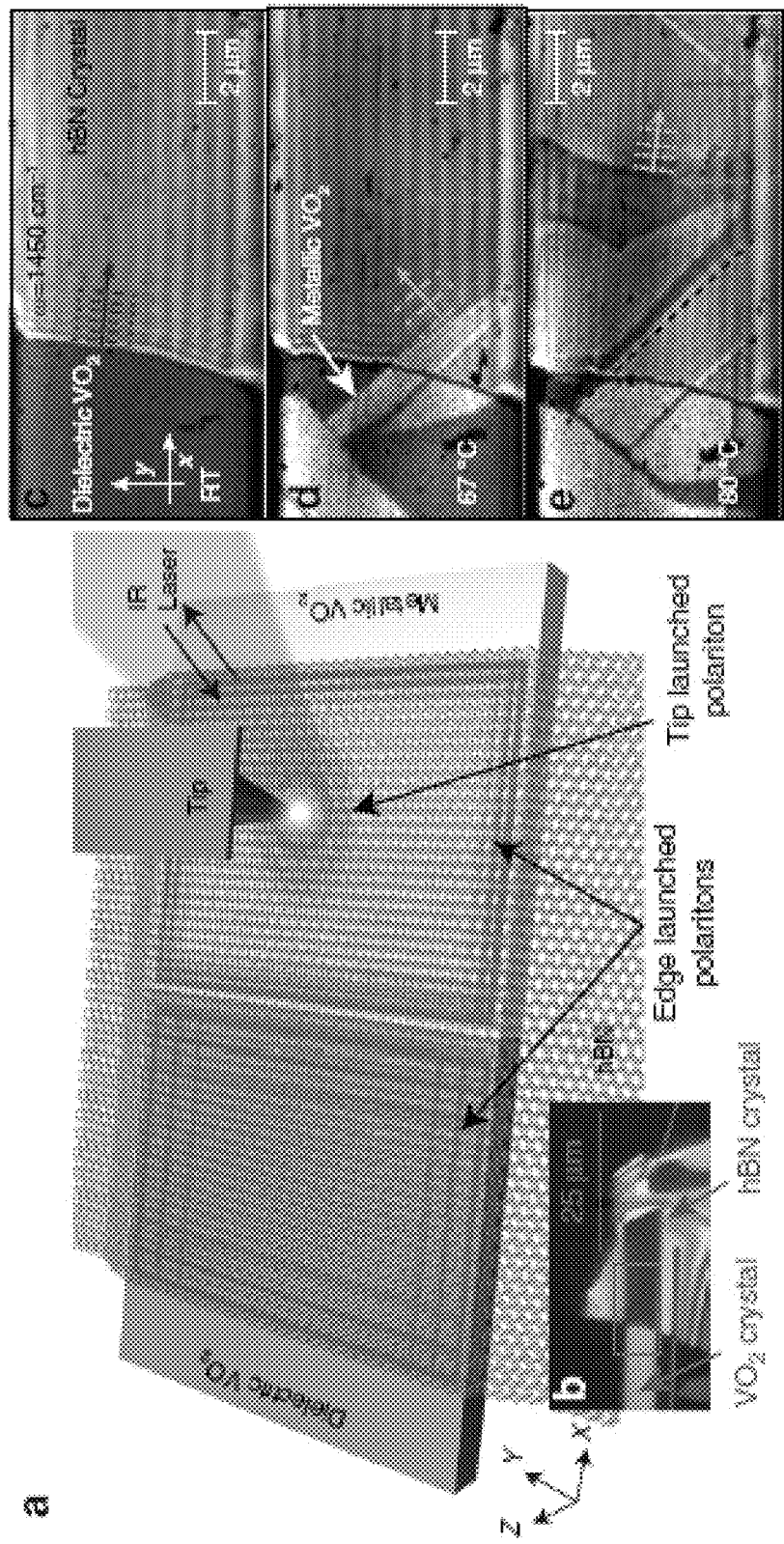
FIG. 3 illustrates an active reconfigurable hyperbolic metasurface according to principles described herein.

FIG. 3 shows an actively reconfigurable PCM-hyperbolic metasurface device. FIG. 3a illustrates device and experimental schematic, in which hBN has been transferred to the top surface of a $VO_2$ single crystal and polaritons are imaged by the s-SNOM tip. FIG. 3b is an optical microscope image of the heterostructure. FIGS. 3c-e are s-SNOM images of the optical near-fields excited at 1450 $cm^{-1}$ at various temperatures, showing HPhPs propagating over both metallic and dielectric $VO_2$ domains. The complex patterns that form are the consequence of multiple interfering waves over the different domains. The arrows show the following: purple highlights tip-launched modes reflected from the hBN edge, whereas blue designates the HPhP propagating within the interior of the hBN from the edge of the dielectric $VO_2$ crystal (boundary with air, suspended hBN). The red arrow highlights the same propagation characteristics as the blue arrow, except for HPhPs propagating over the metallic $VO_2$ domains. The orange and green arrows designate HPhPs propagating within the hBN from the domain boundaries between the dielectric and metallic domains of the $VO_2$, with the orange (green) propagating over the dielectric (metallic) domains. In FIG. 3e, the black dashed line indicates the edge of the $VO_2$ metallic domain, extrapolated from the domain outside the hBN crystal.

Figure 4:
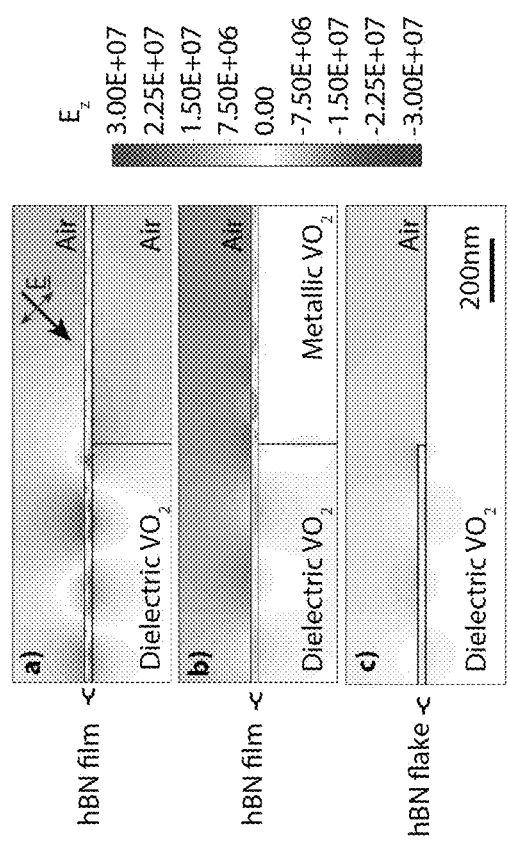
FIG. 4 is a cross-sectional plot of electromagnetic fields from hyperbolic polaritons launched at an interface between various materials.

FIGS. 4a-c show a cross-sectional plot of electromagnetic near-fields from hyperbolic polaritons launched at the interface between dielectric $VO_2$ and vacuum (FIG. 4a), dielectric $VO_2$ and metallic $VO_2$ (FIG. 4b) and at the edge of a hBN flake on $VO_2$ (FIG. 4c). The peak electromagnetic fields launched above the dielectric domain are ~2.3·10$^7$ V/m, ~1.8·10$^7$ V/m and ~1.2·10$^7$ V/m, indicating the strongest fields are launched at the edge of the $VO_2$ flake, however, these simulations clearly show that edge-launched modes are highly suppressed in FIG. 4c).

The illustrated sample presents three different interfaces, each of which can have distinctive properties in terms of launching polaritons in the s-SNOM experiment. Observing a tip-launched mode requires a strong reflection from an interface, while observation of an edge-launched mode demands strong scattering off the sample edge. Considering the edge of the hBN flake, the polariton cannot propagate past the edge of the flake and therefore nearly 100% is reflected, leading to a strong tip-launched mode. On the other hand, these hBN flakes are thin (24 nm), and therefore interact only weakly with incident waves, suppressing the edge-launched mode. Thus, only the tip-launched mode can be observed near the hBN crystal edge.

Second, there is an interface where the hBN extends over the edge of the $VO_2$ crystal. As the flakes of hBN are continuous across the VO$_2$ edge, tip-launched modes can propagate over this interface and will only be weakly reflected. On the other hand, the VO$_2$ crystal itself strongly scatters incident waves to launch polaritons from the VO$_2$ crystal edges. Therefore, the edge-launched modes can only be seen at the interfaces between hBN and the VO$_2$ crystal.

The third type of interface is the domain boundaries between dielectric and metallic VO$_2$. Due to the relatively small size of the domains in this sample, these show much weaker s-SNOM signals, however, the same arguments as for the edge of the VO$_2$ crystal hold. Therefore, the edge-launched polaritons are mainly seen. This hypothesis is qualitatively supported by electromagnetic simulations of plane waves incident on these three types of boundaries presented in FIG. 4. The results show that polaritons launched from the VO$_2$ crystal edge (FIG. 4a) or dielectric-metal domain boundaries (FIG. 4b) are relatively strong, whilst those initiated from the edge of the hBN flake (FIG. 4c) are relatively weak in intensity.

Figure 5:
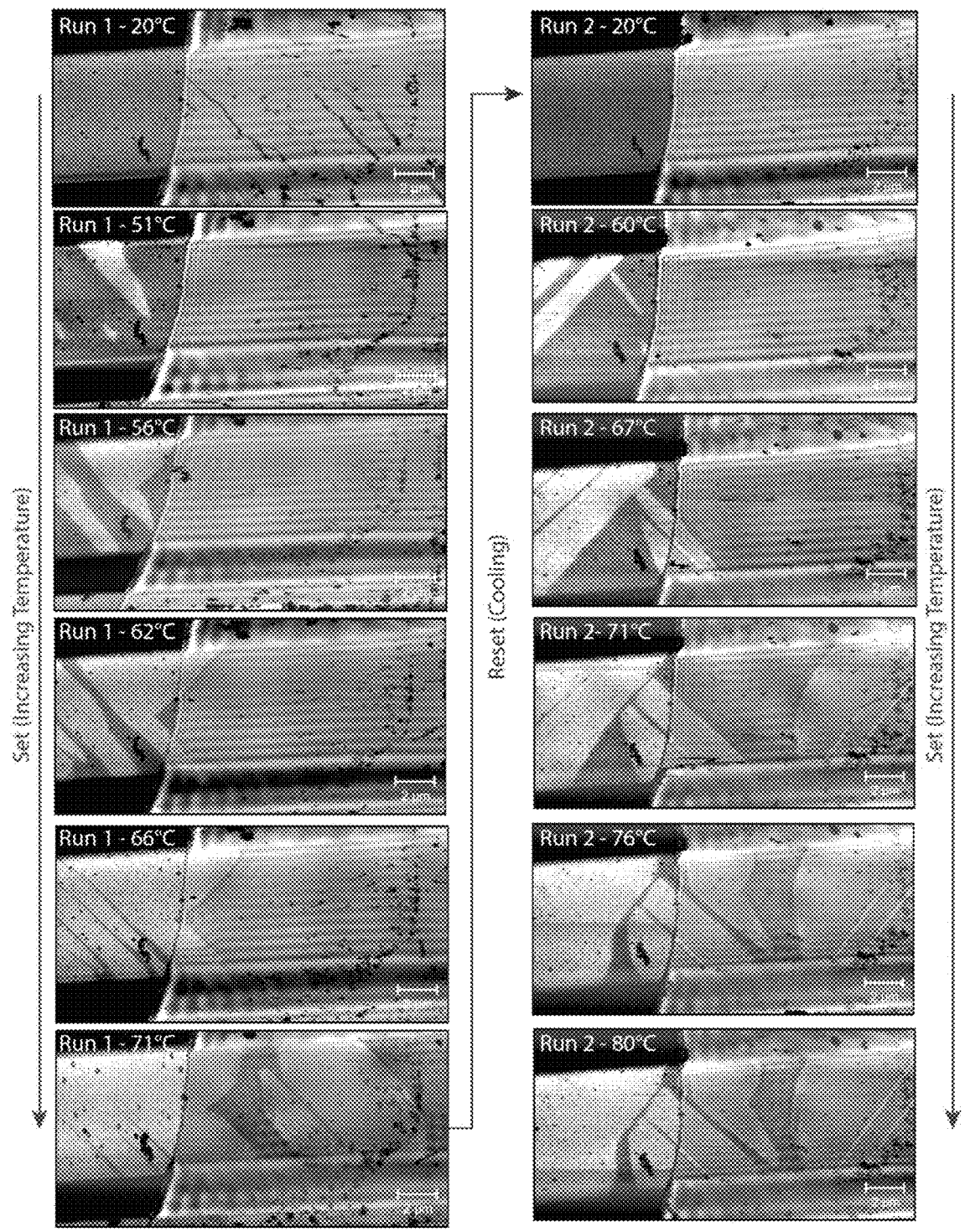
FIG. 5 are s-SNOM photographs showing thermally induced phase transition of $VO_2$ for reconfigurable metasurfaces.

For the experimental efforts exploring the changes in polariton wavelength, refraction and propagation over the two VO$_2$ domain types, a series of heating and cooling cycles was employed, with s-SNOM measurements performed at various temperatures and incident frequencies. The generalized process for these measurements is summarized in FIG. 5, whereby the sample was initially measured using s-SNOM at room temperature, then heated to various temperatures just below, within and then above the phase-change transition temperature, with s-SNOM measurements performed at each of these specific temperatures within this range. Following these efforts, the sample was cooled, thereby resetting the VO$_2$ to the dielectric phase, where the process could be repeated with different phase-change domain structures. Multiple heating and cooling cycles were performed, with no changes in the response of the dielectric functions of the constituent materials observed, thereby illustrating the reproducibility of this process. FIG. 3 shows the thermally induced phase transition in VO$_2$ for reconfigurable metasurfaces. FIG. 5 is series of s-SNOM images taken at the same position on the sample as the sample temperature was increased, showing the growth of metallic VO$_2$ domains, which manipulate polariton propagation in hBN. By cooling the device back to room temperature, the device is reset to its dielectric state, and, upon reheating, forms a different phase domain pattern.

Propagation of HPhPs is strongly influenced by the local dielectric environment. For example, the influence of the VO$_2$ phase transition can be evaluated by measuring the s-SNOM response of the sample as a function of temperature, traversing the full dielectric-to-metal transition from 60° C. to 80° C. The sample was heated in situ inside the s-SNOM microscope on a custom-built heating stage. Individual VO$_2$ domains were directly observed with s-SNOM due to the dielectric contrast between domains, with metallic (dielectric) VO$_2$ appearing as bright (dark) regions, as shown in FIG. 3d. As the device was heated further (FIG. 3e), the hBN-supported HPhPs were observed to propagate over both the metallic and dielectric domains of VO$_2$, with appreciable propagation distances over both regions. This contrasts with surface polaritons and PCMs, where the polaritons propagate for only a few cycles over the dielectric phase and are entirely precluded from propagation over the metallic regions. Thus, the volume confinement of the local electromagnetic near-fields of HPhPs supported within the low-loss hBN appears to prevent the polaritonic fields from being absorbed by the lossy metallic phase of VO$_2$. After heating to elevated temperatures and performing these s-SNOM measurements, allowing the device to cool to room temperature resets the VO$_2$ crystal to its dielectric state, after which the sample can be reheated to get a different PCM domain pattern (see FIG. 5). Thus, the device can be reconfigured to study the propagation of HPhPs in a range of different geometries and at different frequencies within the same device. The large permittivity difference between metallic and insulating phases of VO$_2$ therefore presents an excellent platform to manipulate and control polariton propagation within hyperbolic materials.

When the s-SNOM maps the evanescent fields of propagating HPhP waves in the presence of multiple interfaces, complex images result from the superposition of the waves launched, transmitted across and reflected by each domain boundary, crystal edge, and the s-SNOM tip. The simplest polaritons to identify are the modes launched from the edge of the VO$_2$ crystal, as they form straight fringes aligned parallel to the crystal edge. Due to the difference in local dielectric environment, these HPhPs propagating over the dielectric and metallic domains will possess different polariton wavelengths $\lambda_p$. Here the HPhP mode launched by the VO$_2$ crystal edge over the dielectric (metallic) domain is highlighted by the light blue (red) arrow in FIGS. 3c and 3d and demonstrate that the HPhP wavelength is modified from $\lambda/12.9$ to $\lambda/20.4$ by the PCM at 1450 cm$^{-1}$ between these domains, serving as the first report of the dispersion of HPhPs being tuned by a PCM. Here $\lambda$ refers to the wavelength of the incident light in free-space (e.g. ~6.9 μm at 1450 cm$^{-1}$). Propagation lengths (1/e) are approximately 2.83 μm (5.2 cycles) and 0.8 μm (2.5 cycles) in the dielectric and metallic phases at this frequency, respectively, which is comparable to propagation lengths in naturally abundant hBN (~3.1 and 2.5 am at the same wavevectors, respectively). Furthermore, in FIGS. 3d-e, s-SNOM images show that HPhPs are directly launched in the hBN at the boundaries between the dielectric (orange arrow) and metallic (green arrow) domains, despite there being no appreciable change in the topography of the VO$_2$ crystal.

Figure 6:
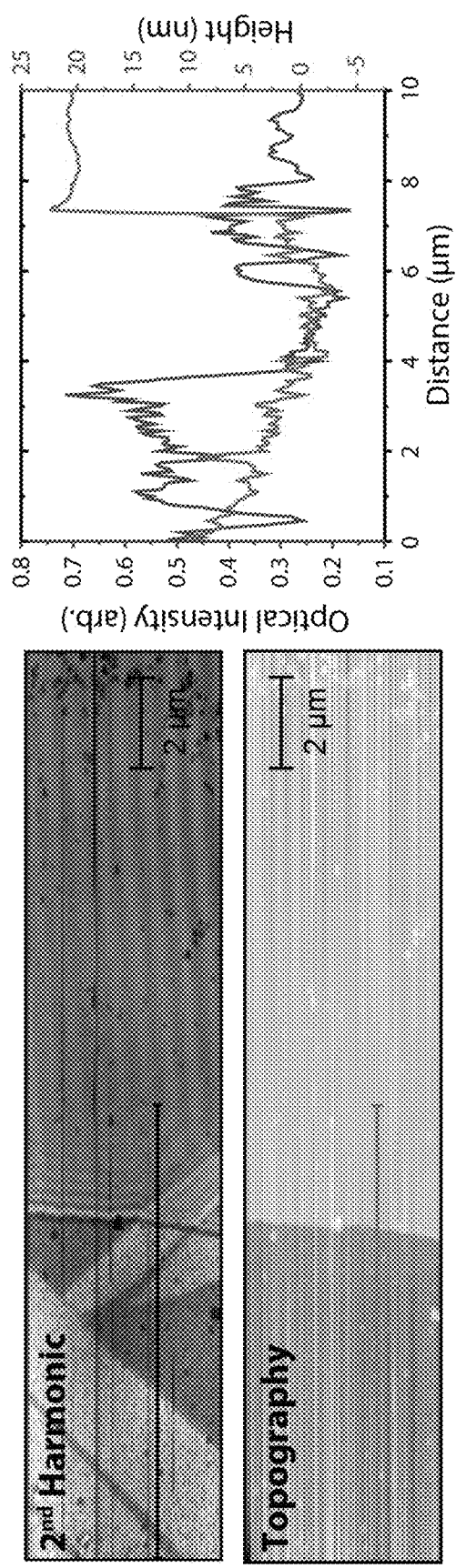
FIG. 6 shows the lack of topographic variation upon phase transition.

FIG. 6 shows topographic variation upon phase transition. Near-field $2^{nd}$ Harmonic IR amplitude are shown at the left top and topography is shown at the left bottom, with the correlated line profiles provided on the right (red—IR amplitude and black—topography). To show that the observed optical effects are attributable to changes in the dielectric environment and not to topographical changes along the out-of-plane axis, spatial maps of the sample were compared with optical s-SNOM measurements (FIG. 6). Comparing line scans at the same spatial location in both $2^{nd}$ harmonic IR amplitude s-SNOM signal and topographical height, while there appears to be small topographic variations (due to noise induced at elevated temperatures, and residual contaminants from the device fabrication process), these do not correlate with the location of domains in the IR s-SNOM amplitude maps. This clearly demonstrates that the domains observed in the IR s-SNOM maps are due to the changes in the PCM dielectric function, not to changes in the topography of the sample surface.

Although past work has shown that PCM domain boundaries can serve to launch polaritons, here they are launched and propagate over both phases, with a different wavelength over each, promising the potential for dynamically reconfiguring HP properties and propagation.

Figure 7:
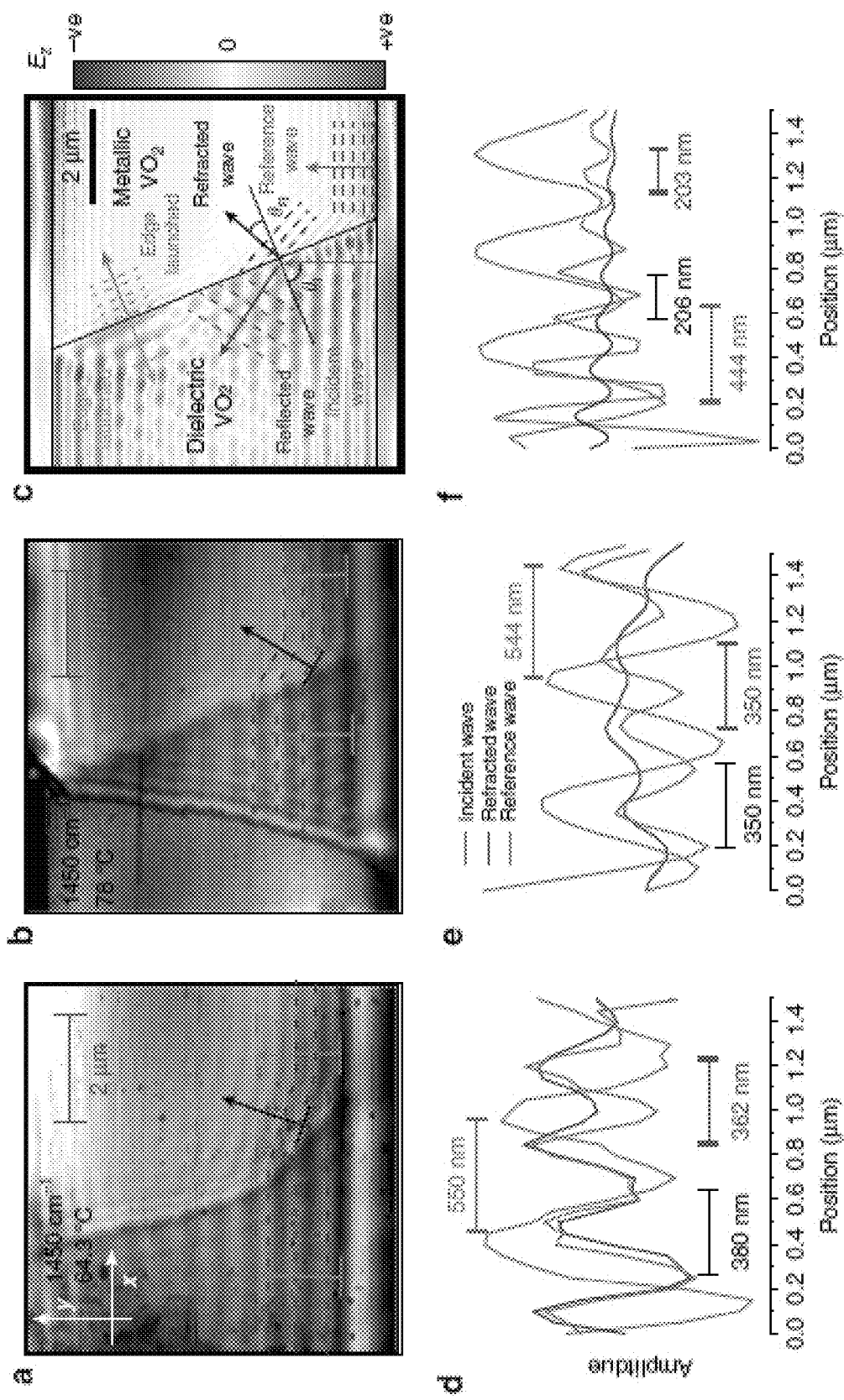
FIG. 7 shows hyperbolic polariton refraction within a hBN-$VO_2$ heterostructure.
Figure 8:
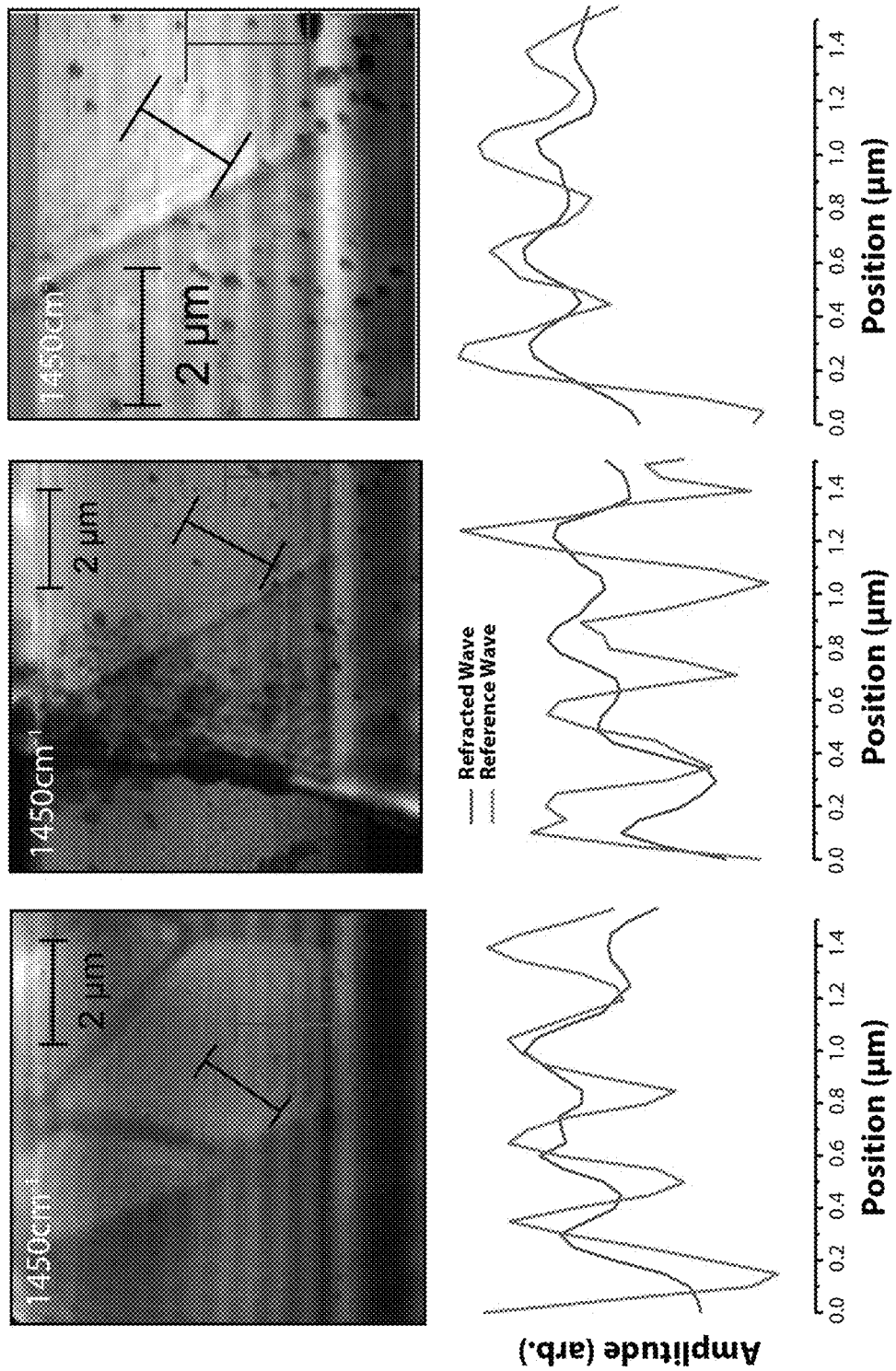
FIG. 8 shows additional images of polariton refraction in s-SNOM experiments.

A heterostructure (or superlattice) as described herein enables the transmission of polaritons across the aforementioned domain boundaries. To simplify s-SNOM images and subsequent analysis, domain geometries with only a single boundary are required. As the positions of domain boundaries induced via thermal cycling of the VO$_2$ phase change are naturally quasi-random, multiple heating and cooling cycles (see FIG. 5) achieve single dielectric-metal interfaces on the VO$_2$ crystal suitable for study. Examples are shown in FIG. 7a, FIG. 7b and FIG. 8. Such "reconfiguring" of the metasurface has been repeated more than eight times in our experiments, with no appreciable change in the dielectric properties of either of the two phases of VO$_2$ or the hBN flake, demonstrating the repeatability of this process.

FIG. 8 provides additional images of polariton refraction in s-SNOM experiments. Dark patches on the images are contaminants that built up on the sample due to continuous imaging at high temperatures. The s-SNOM maps were collected at 1450 cm$^{-1}$ frequency and 65.5, 58 and 55.7° C. temperatures.

Of interest is the polariton wave front that propagates away from the VO$_2$ crystal edge in the y direction (purple dashed line with black arrows in FIG. 7a and FIG. 7b): it meets the domain boundary and distorts, propagating in a direction that is not normal to either the domain or crystal edge. This is a signature of planar polariton refraction as the wave changes direction due to the local change in dielectric environment. Although planar polariton refraction has been reported previously for plasmon polaritons, this was achieved in a fixed graphene structure and thus was not reconfigurable. This is the first direct observation of refraction for hyperbolic polaritons and the first evidence for such polariton refraction as a function of incident (transmitted) polariton angle and the first in a reconfigurable geometry.

If a hyperbolic polariton traverses the boundary between metallic and insulating VO$_2$ domains, the angle of propagation changes to conserve momentum in accordance with Snell's law:

$$\frac{\sin(\theta_I)}{\sin(\theta_R)} = \frac{n_2}{n_1}$$

where n$_1$ and n$_2$ are the indices of refraction in the first and second media, and $\theta_I$ and $\theta_R$ are the corresponding angles of incidence and refraction. To demonstrate that the experimentally measured images are due to refraction, the results in FIG. 7b were compared to a simplified electromagnetic simulation (FIG. 7c). In the simulation, the structure was excited with plane waves (45° incidence) and at the edges of the VO$_2$ crystal. Polaritonic waves were launched that propagate across the surface, mimicking edge-launched polaritons. Note that the tip-sample interaction was ignored in these simulations. Instead, HPhPs excited at the edge of the VO$_2$ crystal (blue) propagate in the y direction within the dielectric phase. When these HPhPs approach the angled dielectric-metallic domain boundary (black line), some of the wave will be reflected (brown) and some will be transmitted across the boundary (black) and refracted due to the mismatch in wavevectors (wavelengths) for the HPhPs supported over the two PCM domains. The simulation also shows waves launched directly from the domain boundary (orange and green) in FIGS. 3c and 3d. The refracted wave will not propagate normal to either the edge of the crystal or the domain boundary but will have the same polariton wavelength as the wave launched in the hBN by scattering of incident light from the metallic VO$_2$ crystal edge. This is indeed what is shown in experiments by the corresponding line profiles provided in FIGS. 7d-f. In this case, the wave reflected by the metal-dielectric domain boundary is not observed experimentally due to interference with the edge-launched mode shown in light blue. Despite this, the good agreement between FIGS. 7b and 7c shows clear evidence of HPhP refraction. Although in principle these effects should be observable also with a tip-launched waves in s-SNOM images, during these experiments, a VO$_2$ domain boundary could not be formed sufficiently close to the flake edge (seen in FIG. 3b) to study this effect.

To quantify the change in the polariton wavevector and HPhP refraction induced by the VO$_2$ domains and to test the ability to reconfigure the metasurface, the polariton wavelength dependence on incident frequency and refracted angle in different domain geometries were studied. In the first case, s-SNOM images of the HPhPs within hBN were systemically recorded at several monochromatic incident laser frequencies over both metallic and dielectric domains, and the polariton wavelength subsequently extracted through Fourier analysis of the s-SNOM maps, as has been reported previously. The experimentally extracted polariton wavevector (symbols) agrees well with numerical calculations of the HPhP dispersion for thin hBN slabs on a substrate consisting of either the dielectric or metallic phase of VO$_2$ (see FIGS. 9a and 9b), when we consider both tip-launched and edge-launched modes, above both metallic and dielectric VO$_2$, which can be observed in FIG. 10.

FIGS. 10a-c shows how the polariton wavelength for HPhPs in hBN over the given VO$_2$ phases and laser frequencies is determined. In FIG. 10a the s-SNOM amplitude corresponds to line-scan markers perpendicular to the dominant propagating wave. FIG. 10b show line-scan profiles, taken where shown in FIG. 10a. In FIG. 10c the frequency component of each line scan was extracted using fast Fourier transforms (FFTs) with a rectangular window, and the amplitude normalized to the mean-square amplitude (MSA). The peaks show the dominant frequencies in the line scan. Peak positions were converted to wavevector and used to plot the dispersions in FIG. 9.

Figure 9:
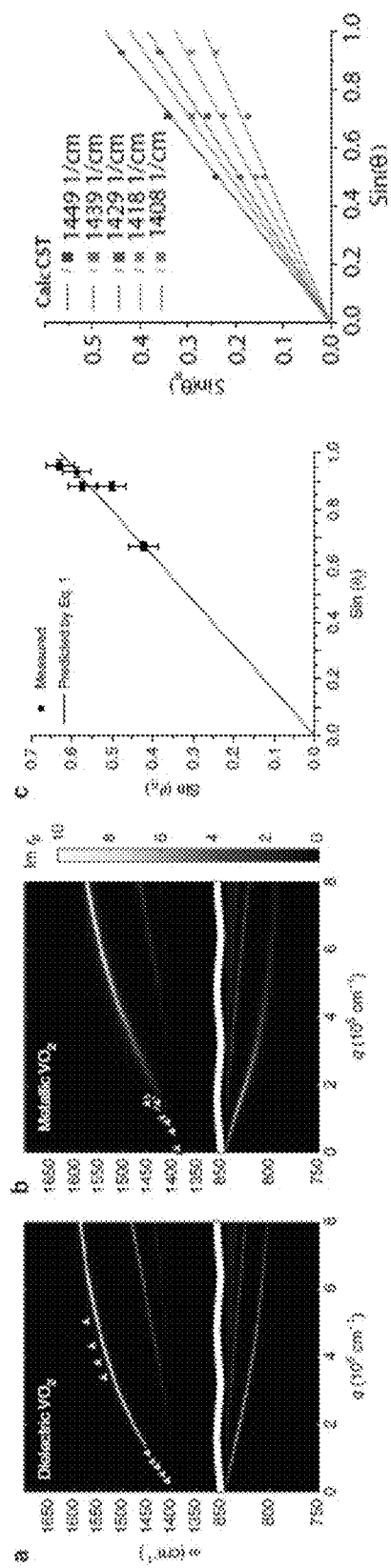
FIG. 9 shows hyperbolic polariton dispersion in hBN over $VO_2$ domains.

FIG. 9 shows HPhP dispersion in hBN over both dielectric (FIG. 9a) and metallic (FIG. 9b) domains of VO$_2$ compared with numerical calculations. The horizontal white line shown in a and b indicates a break in the graph, between upper (1394~1650 cm$^{-1}$) and lower (785~845 cm$^{-1}$) Reststrahlen bands. From the measured dispersion, the angle of the refracted waves at 1450 cm$^{-1}$ can be computed for a given incident angle and compared against experimentally measured results in FIG. 9c. There has been no fitting in this result. The x and y error bars in c represent the standard deviation of measurements of incident (±1°) and refracted (±2°) angles, respectively.

Figure 10:
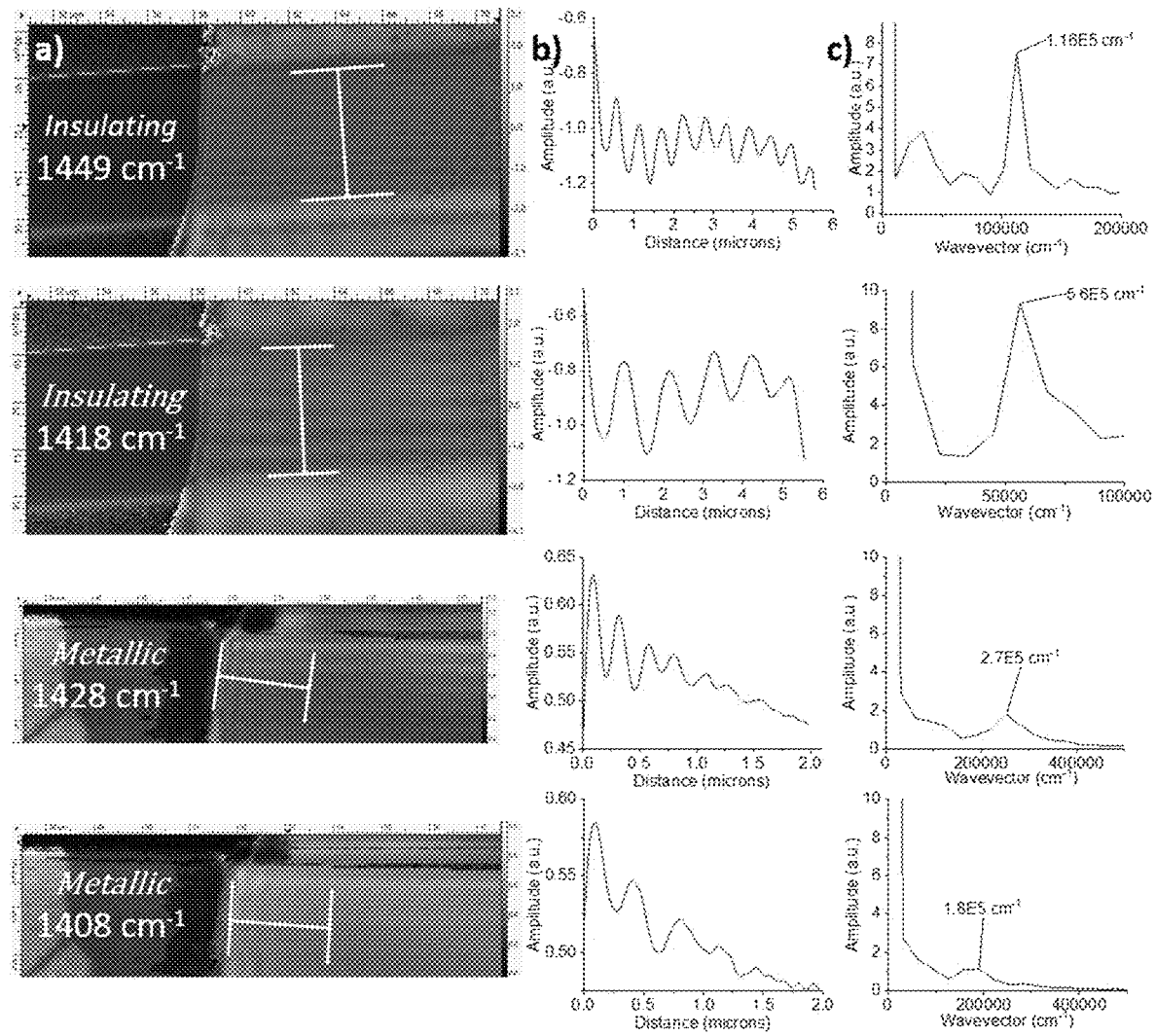
FIG. 10 shows polariton wavelength for given phases of $VO_2$.

Experimental demonstration of HPhP refraction for polaritons transmitted across a dielectric-metallic domain was presented in FIGS. 7a and 7b. For completeness and to demonstrate how the additional refraction angles that were reported in FIG. 9c, three additional s-SNOM maps that were collected at the same incident frequency as FIGS. 7a and 7b are provided, but were collected during different thermal cycles, generating different domain angles with respect to the VO$_2$ crystal edge. In all cases, the HPhP launching within the metallic domain from the VO$_2$ crystal edge is designated with the red lines, while the refracted HPhP by the black lines. The corresponding linescans extracted from these images are provided below each s-SNOM map and demonstrate again that, despite the refracted wave propagated at a direction that is non-normal to either the VO$_2$ crystal or PCM domain edge, it has the same HPhP wavelength (black curves) as the edge-launched mode in the same domain (red curves). The extraction of the HPhP wavelength as described herein and is illustrated in FIG. 10, in which FIG. 10a provides the s-SNOM maps collected at two different incident frequencies (as labelled) when the underlying VO$_2$ was in the dielectric (top two) and metallic (bottom two) phase. Linescans were collected along the trajectories designated by the white lines in FIG. 10a and are presented for each plot in FIG. 10b. Through implementing a discrete fast Fourier transform (FFT) of these linescans, the frequency component of the HPhP propagation and thus, the HPhP wavelength within these domains can be extracted (FIG. 10c). By plotting the frequency dependence of this wavelength for HPhPs within hBN propagating over both VO$_2$ phases, the dispersion plots presented in FIG. 9a and FIG. 9b, respectively, were realized.

To quantify this phenomenon, we compared the measured dispersion relation of hBN polaritons propagating over both metal and dielectric VO$_2$ to analytically calculated results. Due to the thin layer of boron nitride, even relatively small changes in frequency produce a significant shift in propagation constant in both waves—changing in the ratio $n_1/n_2$. As such, by examining the refracted angle as a function of both frequency and incident angle we verify that Snell's law holds for tightly confined polaritons propagating along a surface.

Again, the change in wavevector between domains at the same incident frequency is attributable to the change in the dielectric constant of VO$_2$ between the two PCM states. From the measured change in polariton wavelength, the ratio of the indices of refraction, $n_1/n_2$, can be calculated to determine the expected angle of refraction for the HPhP waves from Snell's Law Eq. (1) and compared with the refracted angle extracted from the s-SNOM images of FIGS. 7 and 8, to test the adherence to Snell's law for HPhPs (FIG. 9c). This result is consistent with numerical simulations at a range of different angles and frequencies, confirming that Snell's law holds for HPhPs propagating across domain boundaries.

Figure 11:
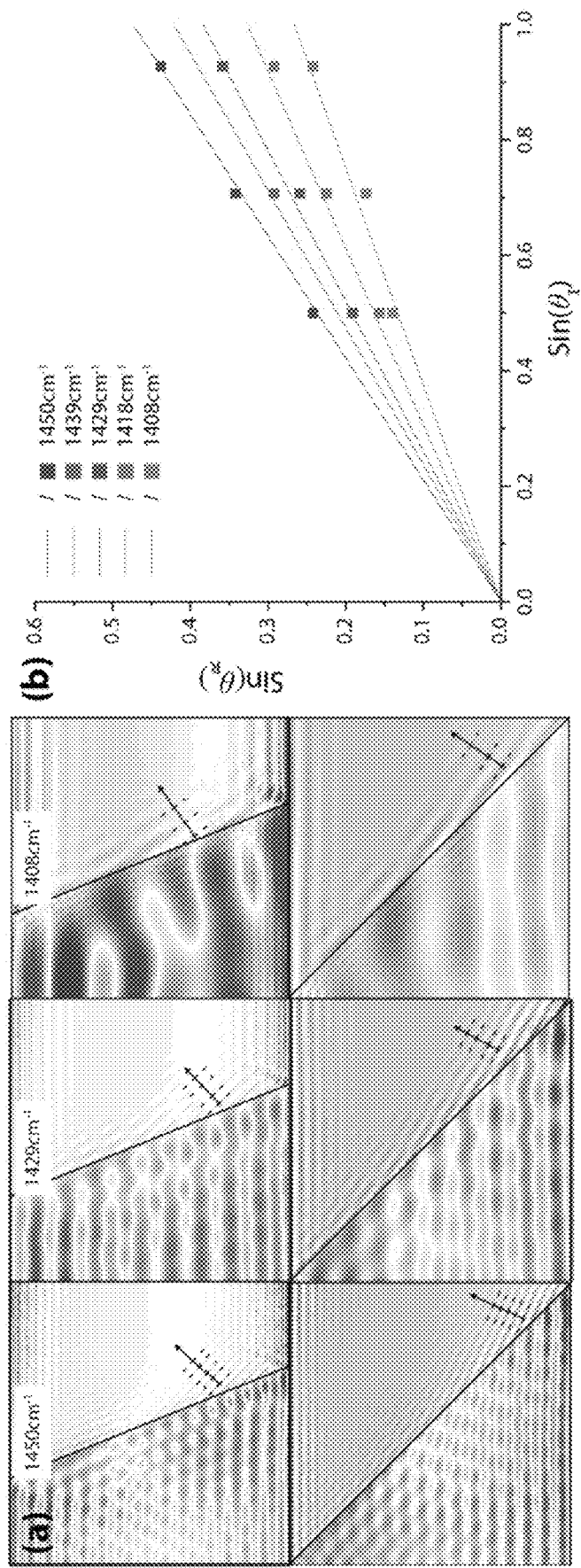
FIG. 11 shows electromagnetic simulations of polariton refraction varying angles.

To supplement experimental results on polariton refraction, electromagnetic simulations were conducted for various metallic-dielectric domain angles and frequencies, identical to FIG. 7c, and presented in FIG. 11a. FIG. 11a illustrates electromagnetic simulations of polariton refraction at 68° and 45° with respect to the surface normal. Each image shows the refracted wave and was used to create the data points shown in FIG. 11b in which Snell's law was tested using electromagnetic simulations. The calculations follow Snell's law closely, with discrepancies due to uncertainties in accurately determining refraction angles. In each simulation, the angle of the refracted wave was determined by inspection from FIG. 11b, and was plotted, analogous to FIG. 9c. Lines in FIG. 11b were extracted by calculating $n_1$ and $n_2$ for the polaritons propagating over both the metallic and dielectric domains from the polariton wavelength. As a result, the plots in FIG. 11b contain no fitting parameters, and providing excellent agreement with Snell's law.

Results presented here demonstrate that the tools and concepts of refractive optics are therefore applicable in near-field optical designs. Indeed, the repeatable nature of both the change in polariton wavelength and Snell's law demonstrates that this platform can steer polariton propagation by proper design of the local dielectric environment, thus enabling the rational design of polariton-based, compact and/or on-chip optical components.

The ability to control HPs propagating across phase-domain boundaries opens several possibilities for engineering lithography-free metasurfaces and near-field optics. A rewritable nanoresonator can be designed, in which a periodic array of metallic square domains is created inside the VO$_2$ crystal underneath the hBN (see inset FIG. 12a). FIG. 12a shows a numerically calculated reflection spectrum from an hBN crystal on top of a dielectric VO$_2$ (blue curve), VO$_2$ patterned with metallic and dielectric domains (red curve), and hBN on top of such a patterned VO$_2$ structure (black curve). In simulated spectra for the hBN on top of patterned VO$_2$, there are peaks corresponding to a series of HPhP modes. Although these peaks are relatively small in amplitude (as this geometry has not been optimized for an intense resonant response), these modes can be tuned in frequency by changing the width and periodicity of the metallic domain (see FIG. 13). Thus, in principle, by controlling the size and shape of the metallic domain, one can realize a resonant response that previously was only observed in nanofabricated structures of hBN. This implies that such resonators can be realized without the additional induced losses that are incurred with most nanofabrication approaches. Such resonators could also be achieved experimentally by doping to change the local phase transition properties of VO$_2$.

Patterning of the PCM allows control of the optical properties, such as focal length. According to principles described herein, use of a PCM that can be reconfigured by an external stimulus, such as the application of heat or laser or electricity or other known reconfiguration impetus, may allow for controlling the optical properties of the HP modes. This can be used to realize a number of reconfigurable optical processes, such as modifying the focal length of a planar lens design, local optical contrast, index of refraction, absorption, etc., and therefore enabling devices according to principles described herein to optical communication in a compact environment.

Figure 12:
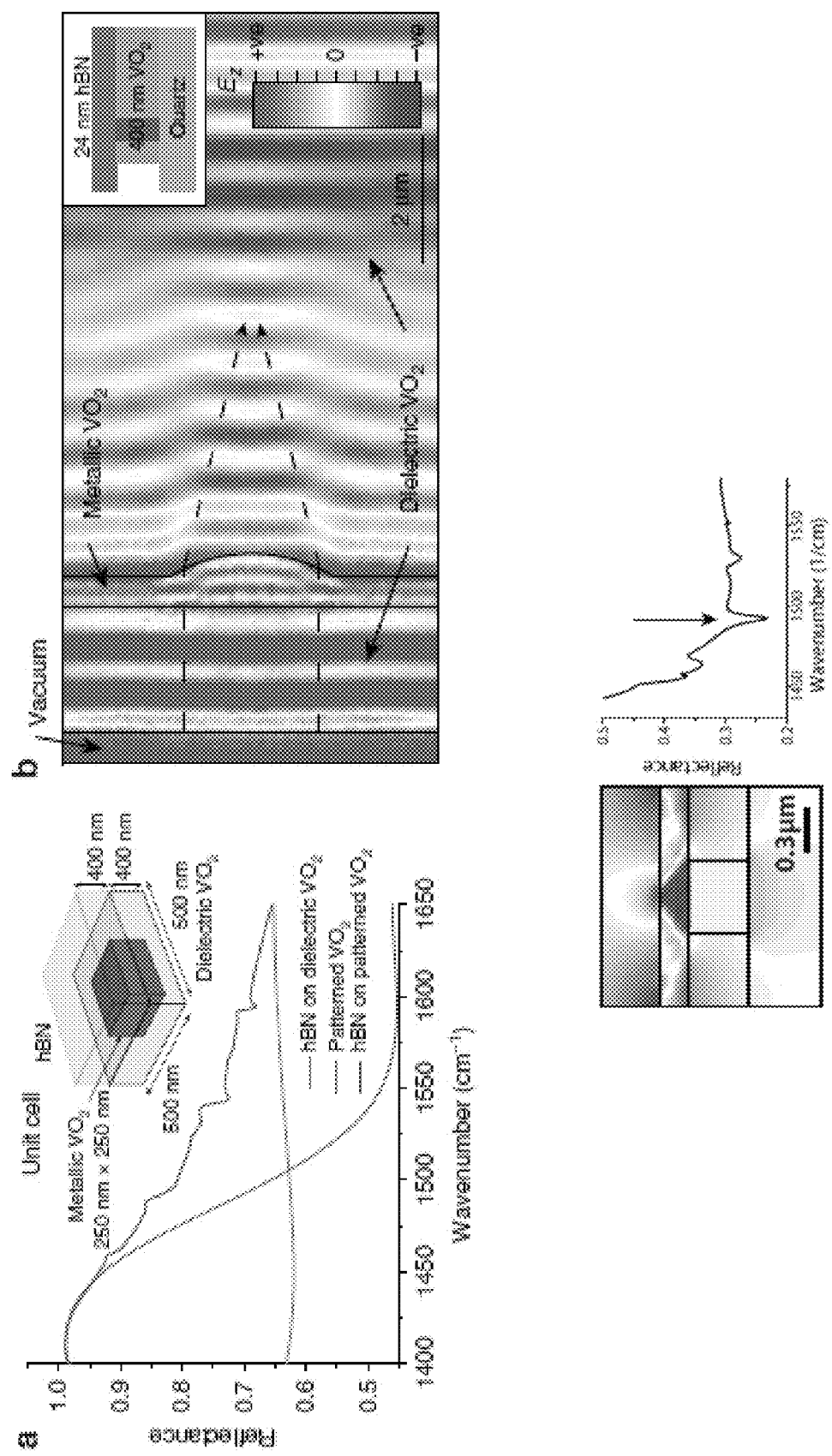
FIG. 12 shows refractive planar optics and a reconfigurable device using phase change materials according to principles described herein.

FIG. 12 provides a schematic of refractive planar optics and reconfigurable resonators using PCMs. FIG. 12a illustrates a tunable polariton metasurface of hBN and VO$_2$, which consists of a continuous film of hBN 400 nm thick on top of 400 nm of VO$_2$. By patterning the VO$_2$ with metallic domains, a rewritable reflection profile can be excited, a profile not achievable by either material alone. In this exemplary design, the pitch is 500 nm, with a particle length 250 nm. As shown in FIG. 12a, a unit cell may be defined by an index contrast between a central square of metallic VO$_2$ surrounded by a frame of dielectric VO$_2$ with hBN over the VO$_2$. FIG. 12b is a simulation of a refractive polariton lens, which uses a semi-circular domain of metallic VO$_2$ to launch polariton waves at 1418 cm$^{-1}$. FIG. 12a provides a simulated reflectance spectrum of a hBN film on top of VO$_2$ patterned into metallic and dielectric domains (hereafter referred to as VO$_2$ resonators). Changing the geometry of the structure of the hyperbolic material (e.g. hBN) and/or the PCM (e.g. VO$_2$) changes the propagation properties of the unit cell. For example, the optical lens illustrated could be modified to cause the light to diverge, rather than converge, or two such devices could be combined, for example, to provide collimation as in the standard 4-f configuration.

Frequency tuning may be achieved by, for example, changing resonator size L (L=250 nm in FIG. 4a) with fixed pitch P (P=500 nm in FIG. 12a) and/or, for example, by changing pitch with fixed filling fraction (f=L/P). The reflectance spectrum of such reconfigurable resonators as a function of the resonator size, is provided in FIG. 13a and illustrates both a variation in reflectance, and small changes in the spectral positions of the resonant modes. The change in the overall reflectance can be attributed largely to changes in the reflectance of the underlying VO$_2$ domains, with larger metallic domains exhibiting higher reflectivity. The spectral mode shifts are approximately 3.34, 3.34, 4 and 2 cm$^{-1}$ from lowest to highest modal wavenumbers, which is much lower than what would be expected for localized resonances. The lower values may result from the influence of grating pitch with a constant fill fraction in FIG. 13b. Here it can be seen that each mode red-shifts significantly (approximately 30 cm$^{-1}$ for the mode around 1525 cm$^{-1}$) with increasing grating pitch. Note that here the overall reflectance does not change significantly, as the fraction of metallic vs dielectric VO$_2$ remains approximately constant once the fill fraction is fixed. The resonant tuning behavior is consistent with the metasurface effectively acting as a grating coupler, as HPs can freely propagate through the hBN film. While significant absorption or reflection resonances induced by the metasurface design are not shown, this could potentially be achieved by optimizing the combination of hBN thickness, VO$_2$ crystal thickness and lateral size, along with the designed metallic domain pitch and size.

Accordingly, the phase change material can be manipulated by changing the local structure, for example, to manipulate polaritons in the adjacent hyperbolic material, thus tuning the wave-propagation properties of the polaritons in the hyperbolic material.

Figure 13:
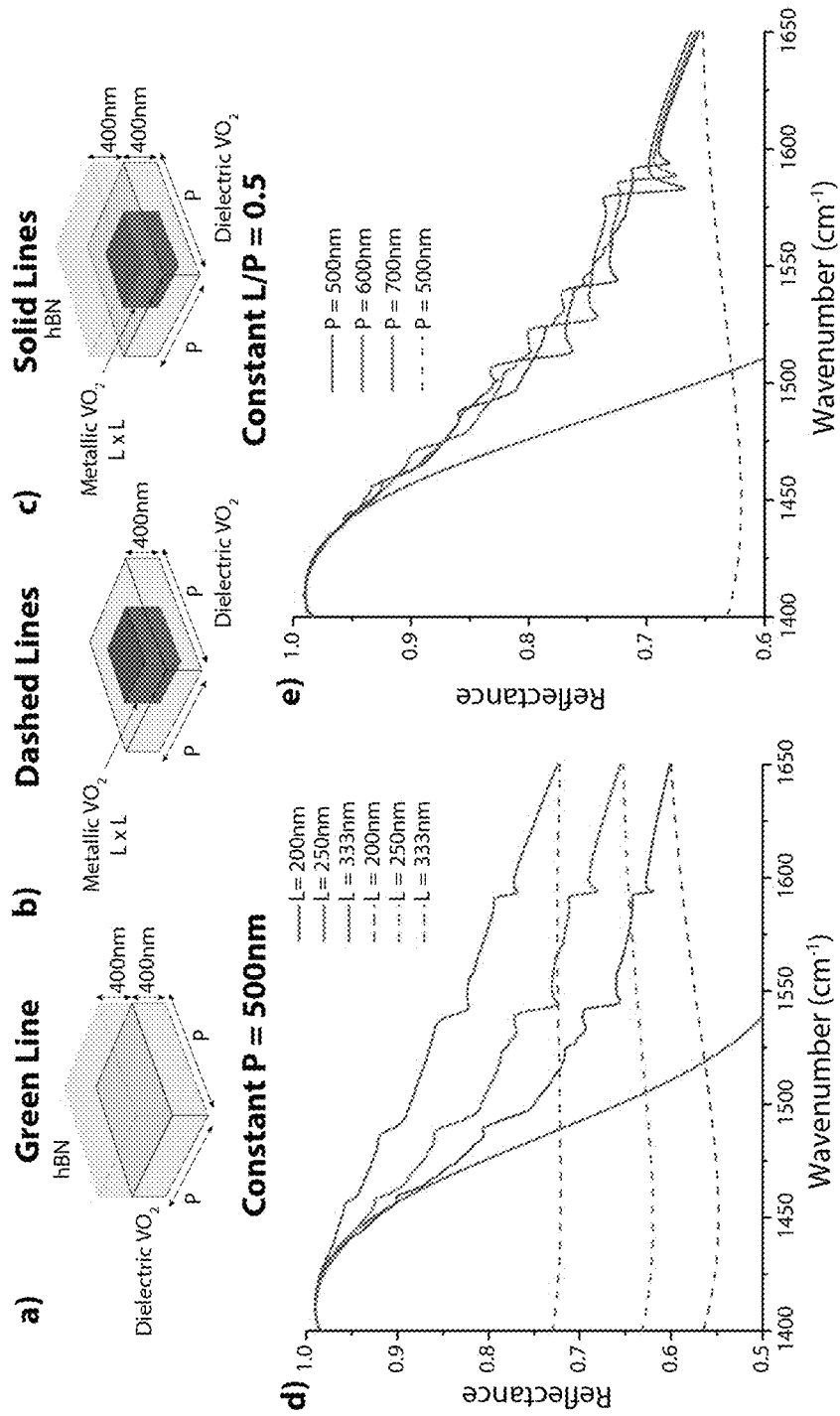
FIG. 13 illustrates frequency tuning of hyperbolic modes for the metasurface of FIG. 12.

FIG. 13 illustrates frequency tuning of hyperbolic modes for the metasurface presented in FIG. 12a. FIG. 13a shows tuning of the resonant modes for different metallic domain sizes at constant pitch and FIG. 13b shows the tuning of the resonant modes for variable domain pitch.

Refraction of HPs across boundaries also enlarges the toolbox for near-field optics to include those of conventional refractive systems, such as in-plane lenses, whereby polaritons are focused to a point via refraction. A simulation of such a lens is shown in FIG. 12b, where HPhPs are launched into hBN at the left crystal edge and propagate inward to a region over a hemispherical VO$_2$ metallic domain, after which they are focused to a spot in the area over the dielectric VO$_2$. Here, the combination of hyperbolic media and PCMs is meaningful, because for conventional surface polaritons, the high losses of the PCM metallic state would preclude polariton propagation and thus the polariton refraction required to induce focusing. The principles of this exemplary reconfigurable nano-optics platform using heterostructures comprising thin slabs of hBN on VO$_2$ single crystals, can readily be generalized to other materials. To demonstrate this, a nanophotonic waveguide was simulated using both VO$_2$ and GeSbTe as the underlying PCMs (see FIG. 14). The non-volatile nature of the phase change in GeSbTe, where both states of the PCM are stable at room temperature, offers significant benefits for laser-writing-based approaches aimed at realizing complicated nanophotonic architectures.

Devices and methods according to principles described herein may be reduced to practice and scaled by using VO$_2$ or GeSbTe films grown by sputtering and boron nitride grown by metal organic chemical vapor deposition. Alternatively, the devices and methods can be reduced to practice in different wavelength regimes by changing the hyperbolic material (such as MoO$_3$)

Figure 14:
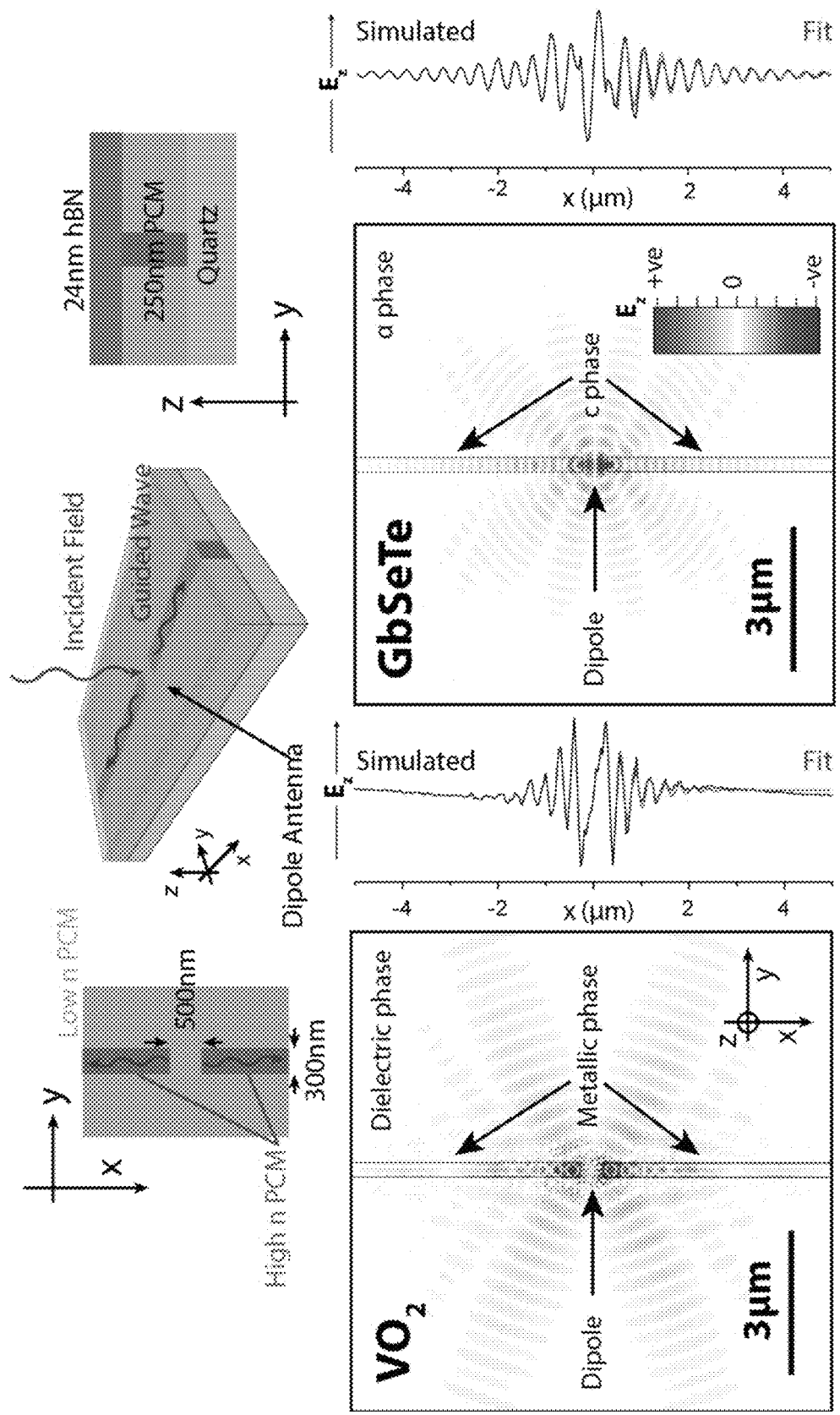
FIG. 14 shows a simulation of near-field waveguide using phase change materials according to principles described herein.

FIG. 14 shows a computer simulation of a near-field waveguide created using HPhPs in hBN over PCMs. The bottom of FIG. 14 shows E$_z$ electric-field profiles taken from the center of the hBN, with extracted line profiles from the center of the waveguide. Red lines show fitting of a damped sine wave to the simulated data. Referring to FIG. 14, the performance of VO$_2$ and GeSbTe PCMs for applications in creating hyperbolic polariton waveguides are compared. GeSbTe also possesses both metallic and dielectric phases, which can be cycled by heating and cooling. In contrast to VO$_2$, the dielectric phase of GeSbTe is amorphous ($\alpha$-phase), and the metallic phase is cubic (c-phase). To simulate a hyperbolic waveguide in both materials, a 300 nm metallic/c-phase domain was formed within a dielectric/$\alpha$-phase of VO$_2$/GeSbTe. This forms a lateral waveguide, where the high refractive index of the PCM within the strip prevents light (in the form of the HP) from escaping. A small gap in the metallic phase (500 nm wide) creates an antenna that couples far-field radiation into both the laterally confined waveguide mode and a radially propagating mode. In the VO$_2$ structure, the radial wave propagates a significant distance over the dielectric domain, due to low losses inherent to the dielectric medium. However, in metallic VO$_2$ the guided wave is suppressed after just a few oscillations, with a 1/e propagation length of $\gamma$=0.57 µm extracted by fitting a decaying sine wave. In contrast, for GeSbTe the waveguide mode appears to propagate a longer distance than the radial mode, with a decay length of $\gamma$=1.57 µm. Accordingly, the phenomena should be observable in GeSbTe films, which might be better suited to some waveguide applications. In principle, by optimizing the waveguide width, hBN and PCM thickness, it may be possible to optimize this structure to achieve long range (>$\lambda$) propagation of the polariton mode.

Without limitation to the overall principles described herein, devices fabricated for the purposes of demonstration were fabricated according to the following methods. VO$_2$ single crystals were grown by physical vapor transport in a quartz tube furnace at 810° C. under 1.7 Torr Ar gas at a flow rate of 25 s.c.c.m. Vanadium pentoxide (V$_2$O$_5$) powder (~0.3 g, Sigma Aldrich 221899) was placed in a quartz boat (10×1×1 cm) upstream of the desired substrates and heated for 1 h. Evaporated V$_2$O$_5$ was reduced to VO$_2$ in this process and deposited on quartz (0001) substrates. Representative crystals from each sample were investigated using Raman spectroscopy to identify the VO$_2$ phase and optical microscopy to verify the thermal phase transition. Smaller, loose crystals located on the substrate surface were removed by adhesion to a heated (60° C.) layer of PMMA firmly brought into contact with the sample and subsequently retracted.

The isotopically enriched hBN crystals were grown from high-purity elemental $^{10}$B (99.22 at %) powder by using the metal-flux method. A Ni—Cr—B powder mixture at respectively 48 wt %, 48 wt %, and 4 wt % was loaded into an alumina crucible and placed in a single-zone furnace. The furnace was evacuated and then filled with N$_2$ and forming gas (5% hydrogen in balance argon) to a constant pressure of 850 Torr. During the reaction process, the N$_2$ and forming gases continuously flowed through the system with rates of 125 s.c.c.m. and 25 s.c.c.m., respectively. All the nitrogen in the hBN crystal originated from the flowing N$_2$ gas.

The forming gas was used to minimize oxygen and carbon impurities in the hBN crystal. After a dwell time of 24 h at 1550° C., the hBN crystals were precipitated onto the metal surface by cooling at a rate of 1° C./h to 1500° C., and then the system was quickly quenched to room temperature. Bulk crystals were exfoliated from the metal surface using thermal release tape. Crystals were subsequently mechanically exfoliated onto a PMMA/PMGI (polymethylglutarimide) polymer bilayer on silicon. Flakes were then transferred from the polymer substrate onto VO$_2$ single crystals using a semi-dry technique and the polymer membrane was removed using acetone and isopropyl alcohol.

Numerical simulations were conducted in CST Studio Suite 2017 using the frequency-domain solver with plane waves incident at 45° and Floquet boundary conditions. In these simulations, polariton modes were only launched by scattering from edges in the simulation and field profiles were extracted using frequency monitors. All results used thicknesses consistent with those measured in topographic scans of the samples. Dielectric functions were taken from literature for isotopically enriched hBN, $VO_2$, and GeSbTe.

Near-field nano-imaging experiments were carried out in a commercial (www.neaspec.com) s-SNOM based around a tapping-mode atomic force microscope. A metal-coated Si-tip of apex radius R≈20 nm that oscillates at a frequency of 2≈280 kHz and tapping amplitude of about 100 nm is illuminated by monochromatic quantum cascade laser beam at a wavelength λ=6.9 μm and at an angle 45° to the sample surface. Scattered light launches hBN HPhPs in the device and the tip then re-scatters light for detection in the far field. Background signals are efficiently suppressed by demodulating the detector signal at the second harmonic of the tip oscillation frequency and employing pseudo-heterodyne interferometric detection.

As shown herein, the dispersion of HPs can be controlled using the permittivity changes inherent in the different (insulating vis á vis metallic) phases of PCMs. This enables the direct launching, reflection, transmission, and refraction of HP waves at the domain boundaries between the different phases of the PCM, due to the large change in HPhP wavelength (by a factor of 1.6 as shown in the experiments) that occurs for modes propagating in the hBN over each of these domains. Thermal cycling of the hBN-$VO_2$ heterostructure creates a range of domain-boundary geometries in the PCM, enabling the demonstration of various near-field phenomena. By inducing well-defined domain structures, it will be possible to design reconfigurable HP resonators and refractive optics in a planar, compact format at dimensions far below the diffraction limit.

Beyond the implications for integrated nanophotonics, reconfigurable HP resonators could be used to match resonant frequencies to local molecular vibrational modes for the relation of dynamic surface-enhanced infrared absorption (SEIRA) spectroscopy. Although the present case experimentally demonstrates these concepts using hBN on $VO_2$, using different combinations of PCMs (such as GeSbTe) and other hyperbolic materials (such as metal/dielectric metamaterials) could see expanded applications over a wide frequency range. Ultimately, it is anticipated that the combination of low-loss, hyperbolic materials, and latchable PCMs will result in applications in lithography-free design and fabrication of optical and optoelectronic devices, whereas volatile PCMs could be used for dynamic modulation in photonic structures.

According to principles described herein, the combination of a hyperbolic material or metamaterial, which can be a natural (e.g. hBN) or artificial (metal/dielectric stack), features an in- or out-of-plane hyperbolic response. The hyperbolic material or metamaterial is combined with a PCM that can be a latchable (e.g. GST) or non-latchable (e.g. $VO_2$) material that can be successfully switched between two material states (e.g. dielectric and metal, crystalline and amorphous, . . . ) via external stimuli (e.g. laser excitation, heat, electrical bias, pressure). The combined hyperbolic material or metamaterial combined with PCM may be used in a variety of technologies to replace far-field refractive optics, whereby index contrast and variable path lengths are used to perform optical functions, but in this case, on a planar surface at length scales smaller than the diffraction limit of light. For example, reconfigurable hyperbolic metasurface devices, tuned by a PCM, may be applied to lenses, beam expanders, beam telescopes, waveguides (confinement of propagating mode due to index contrast between inner and outer regions), directional couplers, interferometer, phase-delay components, prisms and the like. By implementing a gradient in the phase change, such that intermediate states are induced in a defined manner, concepts such as gradient index lenses may be fabricated, but at size scales well below the diffraction limit, unlike conventional devices. Antennas (e.g. gratings, rods, rings, disk arrays, nano-scale versions of standard antennas such as the Yagi-Uda) are also possible.

This concept is based on the principle of defining domains of one phase within a PCM film, with the surrounding material being the other phase. This localized index contrast defines an antenna within the hyperbolic material, thus making a reconfigurable antenna design, including: antenna designs for transmit/receive functions, as in free-space or on-chip communications or signal processing, antenna designs for chemical sensing, including resonant enhancement schemes such as surface enhanced infrared absorption (SEIRA) or via sensitivity to a local change in the refractive index on the surface of the hyperbolic material, as in surface plasmon resonance (SPR) biosensing approaches, antennas for modulators (amplitude modulation schemes).

Thus, metasurfaces according to principles described herein control light propagation at the nanoscale for applications in both free-space and surface-confined geometries. What is demonstrated is a reconfigurable hyperbolic metasurface comprising a heterostructure of isotopically enriched hBN in direct contact with the phase-change material (PCM) single-crystal vanadium dioxide ($VO_2$). Metallic and dielectric domains in $VO_2$ provide spatially localized changes in the local dielectric environment, enabling launching, reflection, and transmission of hyperbolic phonon polaritons (HPhPs) at the PCM domain boundaries, and tuning the wavelength of HPhPs propagating in hBN over these domains by a factor of 1.6. The system supports in-plane HPhP refraction, thus providing a prototype for a class of planar refractive optics. This approach offers reconfigurable control of in-plane HP propagation and exemplifies a generalizable framework based on combining hyperbolic media and PCMs to design optical functionality. Devices according to the principles described herein may also be used for beam control and shaping. This concept is based on the principle of defining wavelength or sub-wavelength scale optical domains such that the far-field response is dictated by an effective medium that superimposes all of the components simultaneously. These include beam-steering and beam-shaping approaches, as well as metasurface and metamaterial concepts using spatially varying nanoscale elements, such as nano disks or rods arranged by a computer-generated scheme to produce a desired output beam shape.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments but should be defined only in accordance with the following claims and their equivalents.

What is claimed is:

1. An optical component, comprising:
   a phase change material having an optical property having a first value associated with a first material phase and a second value associated with a second material phase; and a hyperbolic polaritonic material on the phase change material, the hyperbolic polaritonic material having a first optical response in a first direction and a second optical response in a second direction and a third optical response in the third direction.

2. The optical component of claim 1, wherein the first optical response is metallic in-plane and the second optical response is dielectric out-of-plane and the third optical response is either metallic or dielectric.

3. The optical component of claim 1, wherein the phase change material is patterned and the hyperbolic polaritonic material is located over the pattern.

4. The optical component of claim 3, wherein the pattern comprises a first pattern and a second pattern, the first pattern corresponding to the first optical response and the second pattern corresponding to second optical response.

5. The optical component of claim 4, wherein the first optical response is metallic in-plane and the second optical response is dielectric out-of-plane and the third optical response is either metallic or dielectric.

6. The optical component of claim 1, wherein the optical property is local optical contrast.

7. The optical component of claim 1, wherein the optical property is index of refraction.

8. The optical component of claim 1, wherein the optical property is absorption.

9. The optical component of claim 1, wherein the phase change material is latchable.

10. The optical component of claim 9, wherein the phase change material is germanium antimony telluride.

11. The optical component of claim 1, wherein the phase change material is non-latchable.

12. The optical component of claim 11, wherein the phase change material is vanadium dioxide.

13. The optical component of claim 1, wherein the hyperbolic material comprises hexagonal boron nitride.

14. The optical component of claim 1, wherein the hyperbolic material comprises a natural hyperbolic material.

15. The optical component of claim 1, wherein the hyperbolic material comprises a hyperbolic metamaterial.

16. The topical component of claim 1, wherein the hyperbolic material comprises a hyperbolic metasurface.

* * * * *